(12) United States Patent
Honda et al.

(10) Patent No.: US 7,405,875 B2
(45) Date of Patent: Jul. 29, 2008

(54) SYSTEM MICROSCOPE

(75) Inventors: Susumu Honda, Hachioji (JP); Yasushi Aono, Yokohama (JP)

(73) Assignee: Olympus Corporation, Tokyo (JP)

( * ) Notice: Subject to any disclaimer, the term of this patent is extended or adjusted under 35 U.S.C. 154(b) by 72 days.

(21) Appl. No.: 11/104,844

(22) Filed: Apr. 12, 2005

(65) Prior Publication Data

US 2005/0231798 A1 Oct. 20, 2005

(30) Foreign Application Priority Data

Apr. 14, 2004 (JP) ............................. 2004-119327

(51) Int. Cl.
*G02B 21/00* (2006.01)
*G02B 21/06* (2006.01)

(52) U.S. Cl. .................. 359/386; 359/372; 359/373; 359/385; 359/388; 359/389

(58) Field of Classification Search ................ 359/368, 359/372, 374, 385, 388, 393
See application file for complete search history.

(56) References Cited

U.S. PATENT DOCUMENTS

| 4,619,503 A | 10/1986 | Reinheimer et al. |
| 5,061,074 A | 10/1991 | Ohikata et al. |
| 5,750,989 A * | 5/1998 | Lindsay et al. .............. 250/306 |
| 5,760,396 A * | 6/1998 | Lindsay et al. .............. 250/306 |
| 2002/0151397 A1 | 10/2002 | Takahama |

FOREIGN PATENT DOCUMENTS

| DE | 33 43 112 A1 | 6/1985 |
| EP | 1 582 904 A1 | 10/2005 |
| JP | 2000-89124 A | 3/2000 |
| JP | 2002-55282 A | 2/2002 |
| SU | 1179253 A | 9/1985 |

* cited by examiner

*Primary Examiner*—Stephone B. Allen
*Assistant Examiner*—Lee Fineman
(74) *Attorney, Agent, or Firm*—Frishauf, Holtz, Goodman & Chick, P.C.

(57) ABSTRACT

A system microscope has a specimen mounting part which mounts a specimen, an inverted microscope including an illumination path which radiates illumination light from under the specimen mounting part, and an observation optical path which acquires detection light emitted from the specimen to which the illumination light is radiated, a microscope with upright frame including an illumination path which radiates illumination light from above the specimen mounting part, and an observation optical path which acquires detection light emitted from the specimen to which the illumination light is radiated, and a driving unit which moves at least one of the inverted microscope and the microscope with upright frame in a plane perpendicular to the observation optical path of the inverted microscope or the microscope with upright frame.

10 Claims, 10 Drawing Sheets

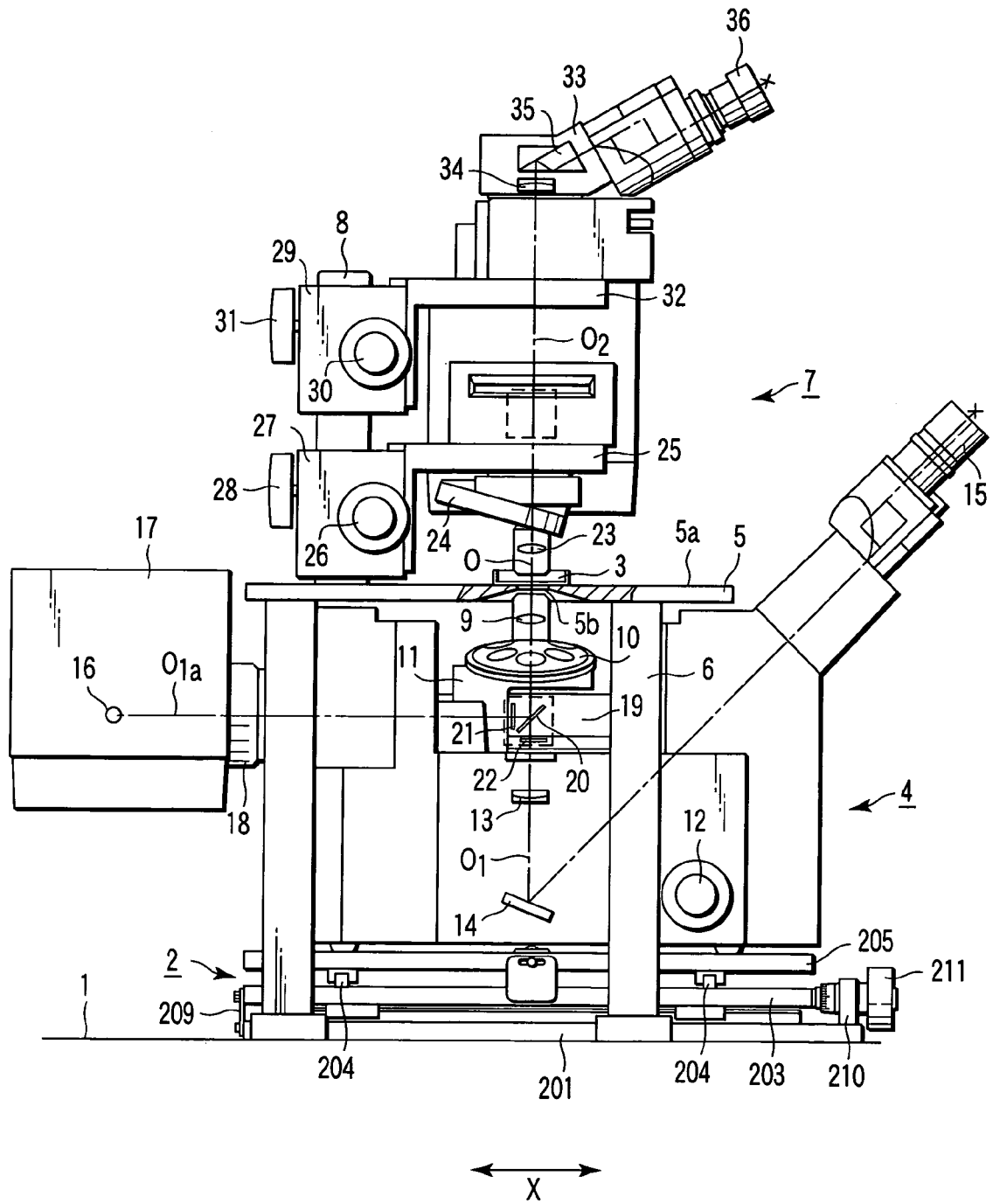
F I G. 4A

SYSTEM MICROSCOPE

CROSS-REFERENCE TO RELATED APPLICATIONS

This application is based upon and claims the benefit of priority from prior Japanese Patent Application No. 2004-119327, filed Apr. 14, 2004, the entire contents of which are incorporated herein by reference.

BACKGROUND OF THE INVENTION

1. Field of the Invention

The present invention relates to a system microscope that is capable of simultaneously observing a specimen in upward and downward directions.

2. Description of the Related Art

There is known a system microscope that includes, as a basic configuration, an inverted microscope, which observes a specimen from its lower side, and also includes the configuration of a microscope with upright frame by disposing observation means on the upper side of the specimen.

An example of the system microscope that is based on this concept is disclosed in the drawings of Jpn. Pat. Appln. KOKAI Publication No. 2000-89124. As is shown in FIG. 1, this system microscope is capable of simultaneously observing the same part of a specimen in upward and downward directions by commonly combining the optical axis of the microscope with upright frame and that of the inverted microscope. In FIG. 1, light from an illumination light source 102 passes through an excitation filter 104 and is reflected by a dichroic mirror 106. The reflected light illuminates the upper side of a specimen 101 via an objective lens 110. Light (fluorescent light) from the specimen 101 is converted to parallel light via the objective lens 110. The parallel light passes through the dichroic mirror 106, and is reflected by a reflection mirror 114 via an emission filter 108 and a tube lens 112. The reflected light is visually observed by an eyepiece 116.

Light from an illumination light source 103 passes through an excitation filter 105 and is then reflected by a dichroic mirror 107. The reflected light illuminates the lower side of the specimen 101 via an objective lens 111. Light (fluorescent light) emitted from the specimen 101 is converted to parallel light via the objective lens 111. The parallel light passes through the dichroic mirror 107, and is reflected by a reflection mirror 115 via an emission filter 109 and a tube lens 113. The reflected light is visually observed by an eyepiece 117.

In this system microscope, depending on purposes of use, the filter may be removed, or the dichroic mirror may be replaced with a 45° incidence filter or a beam splitter (half-mirror). Thereby, for example, the focal positions of the objective lenses 110 and 111, which are disposed on the upper and lower sides of the specimen 101, can independently be set relative to the specimen 101. This enables simultaneous observation of parts of the specimen 101 having a thickness, which are located at different levels of the specimen 101. In addition, by shifting the excitation filter 104 off the optical axis, it becomes possible to perform transmissive observation in which the specimen 101 is illuminated from above and observed from below, and fluorescent observation in which the specimen 101 is illuminated from below and observed from above. Thereby, the fluorescent observation and transmissive observation of the same part of the specimen 101 can be performed at the same time without lowering the fluorescent contrast.

In the system microscope disclosed in KOKAI 2000-89124, however, the relative position between a lower optical path P1, which is constituted by the objective lens 111 and tube lens 113 that are disposed below the specimen 101, and an upper optical path P2, which is constituted by the objective lens 110 and tube lens 113 that are disposed below the specimen 101, are fixed and invariable. Consequently, only a part at the same position of the specimen 101 can be observed at the same time. In other words, different positions on the specimen 101 in a plane perpendicular to the optical axis P cannot be observed at the same time by the upper and lower objective lenses 110 and 111.

To solve this problem, there is known a system microscope, as disclosed in Jpn. Pat. Appln. KOKAI Publication No. 2002-55282, which includes a driving mechanism capable of moving the upper-side objective lens in a plane perpendicular to the upper-side observation optical path. Specifically, in the system microscope of KOKAI 2002-55282, the upper-side objective lens is movable relative to the upper-side observation optical path. By moving the upper-side objective lens, the relative position between the lower-side objective lens and upper-side objective lens is varied so that different positions on the specimen in a direction perpendicular to the optical axis can be observed at the same time by the upper and lower objective lenses. For example, in a case where a laser oscillator is used as the upper-side illumination light source and a laser beam is radiated on the specimen via the upper optical path, the upper-side objective lens may be moved in the plane perpendicular to the upper-side optical path, thus being able to move the radiation position of the laser beam on the specimen. The same advantageous effect is also obtainable in a case where a laser oscillator is used as the lower-side illumination light source and a laser beam is radiated on the specimen via the lower-side optical path.

However, with the system microscope of KOKAI 2002-55282, the following problem is encountered. FIG. 2 shows a state in which different locations on a specimen 120 in a plane perpendicular to an optical axis P are observed at the same time by upper and lower objective lenses 121 and 122. FIG. 3 shows a state in which illumination light is radiated by the upper and lower objective lenses 121 and 122 at the same time on two different locations in a plane perpendicular to the optical axis P.

In the case where different positions in the plane perpendicular to the optical axis P of the specimen 120 are observed by the upper and lower objective lenses 121 and 122, as shown in FIG. 2, only the upper objective lens 121 is moved in the plane perpendicular to the upper-side optical path P2. In this case, the positional relationship between the upper objective lens 121 and upper tube lens 123 is displaced, and part of the parallel light from the upper objective lens 121 may not enter the upper tube lens 123. If the image of the specimen 120 is observed from above in this state, such a problem would arise that an eclipse of the observed image (indicated by hatching in FIG. 2) occurs.

Besides, as shown in FIG. 3, in the case where illumination light is radiated via the upper and lower objective lenses 121 and 122 at the same time on two different positions in the plane perpendicular to the optical axis P, the upper objective lens 121 is moved in the plane perpendicular to the upper-side optical path P2. The illumination light, which is to be radiated on the specimen 120 from above at this time, is reflected by the dichroic mirror 124 that is disposed between the upper objective lens 121 and the upper tube lens 123, and the reflected light is guided to the upper-side optical path P2. Thus, if the positional relationship between the dichroic mirror 124 and upper-side objective lens 121 is displaced, as shown in FIG. 3, part of the beam (indicated by hatching) that is reflected by the dichroic mirror 124 may not enter the upper objective lens 121. As a result, such a problem arises that illumination light that is radiated from the upper objective lens 121 on the specimen 120 become non-uniform.

Similarly, in a case where a laser beam is used as the illumination light source and the laser beam is radiated on the specimen 120 as illumination light, part of the laser beam that is reflected by the dichroic mirror 120 may not enter the upper objective lens 121. Consequently, such a problem arises that the shape of the laser spot deforms and the laser intensity distribution in the laser spot becomes non-uniform.

BRIEF SUMMARY OF THE INVENTION

The present invention provides a system microscope that is capable of always observing different positions on a specimen in upward and downward directions in an optimal state.

A system microscope according to an aspect of the present invention is characterized by comprising: a specimen mounting part which mounts a specimen; an inverted microscope including an illumination path which radiates illumination light from under the specimen mounting part, and an observation optical path which acquires detection light emitted from the specimen to which the illumination light is radiated; a microscope with upright frame including an illumination path which radiates illumination light from above the specimen mounting part, and an observation optical path which acquires detection light emitted from the specimen to which the illumination light is radiated; and a driving unit which moves at least one of the inverted microscope and the microscope with upright frame in a plane perpendicular to the observation optical path of the inverted microscope or the microscope with upright frame.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4A is a side view that shows a schematic configuration of a system microscope according to a first embodiment of the present invention;

DETAILED DESCRIPTION OF THE INVENTION

Embodiments of the present invention will now be described with reference to the accompanying drawings.

First Embodiment

Figure 1:
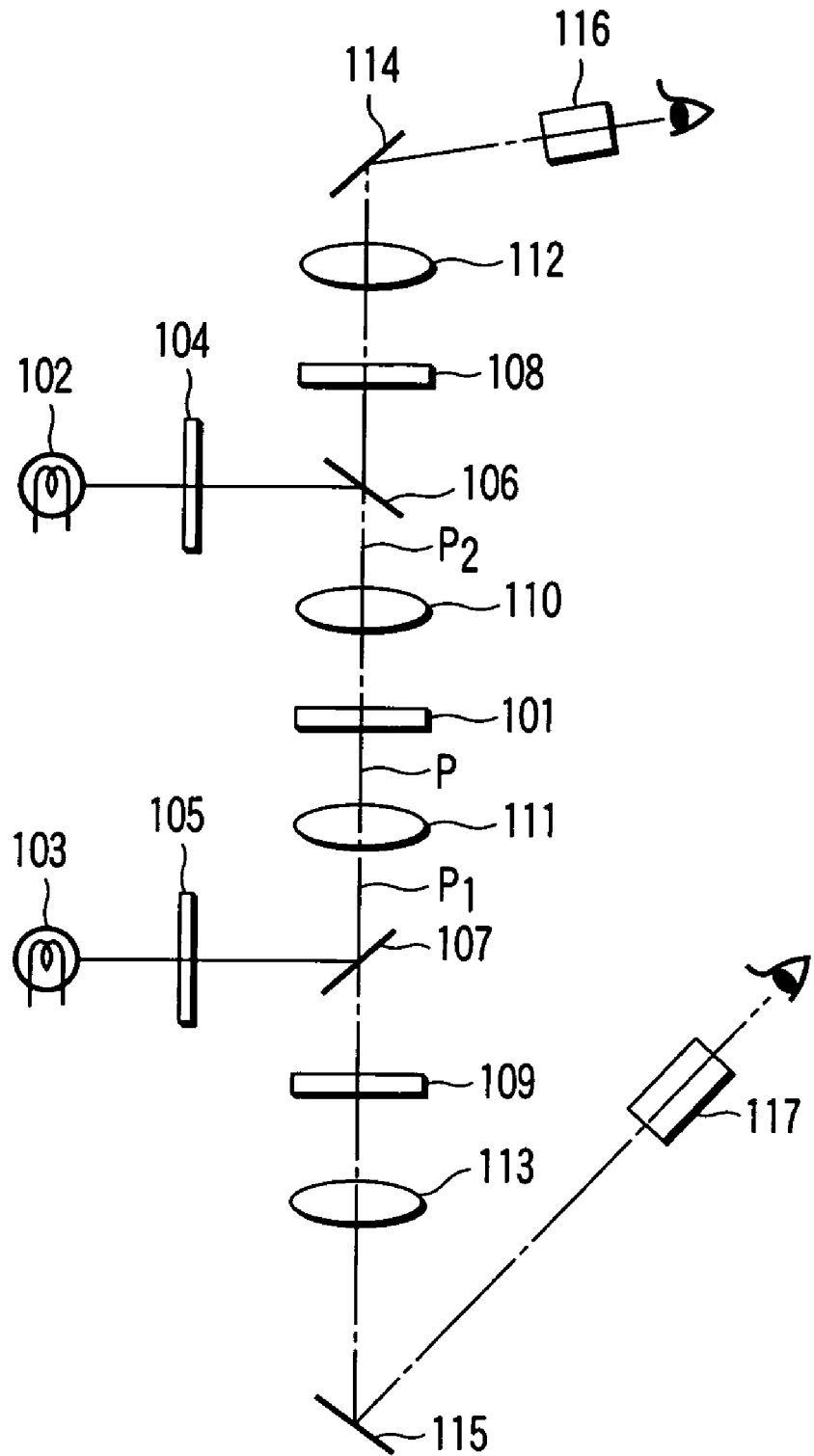
FIG. 1 schematically shows the configuration of an example of a conventional system microscope.
Figure 2:
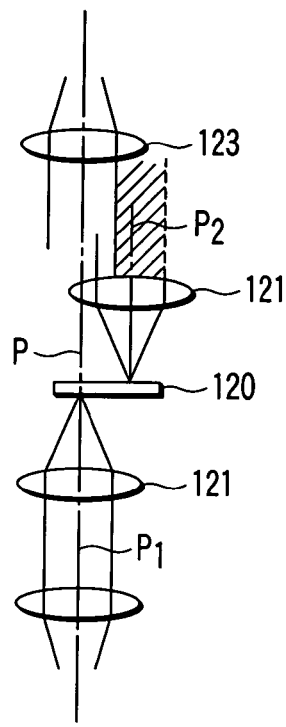
FIG. 2 is a schematic structural view for explaining a conventional system microscope.
Figure 3:
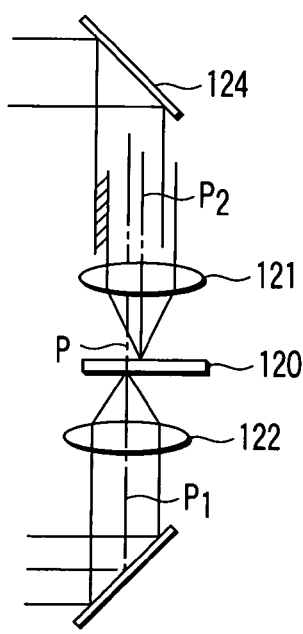
FIG. 3 is a schematic structural view for explaining the conventional system microscope.
Figure 4B:
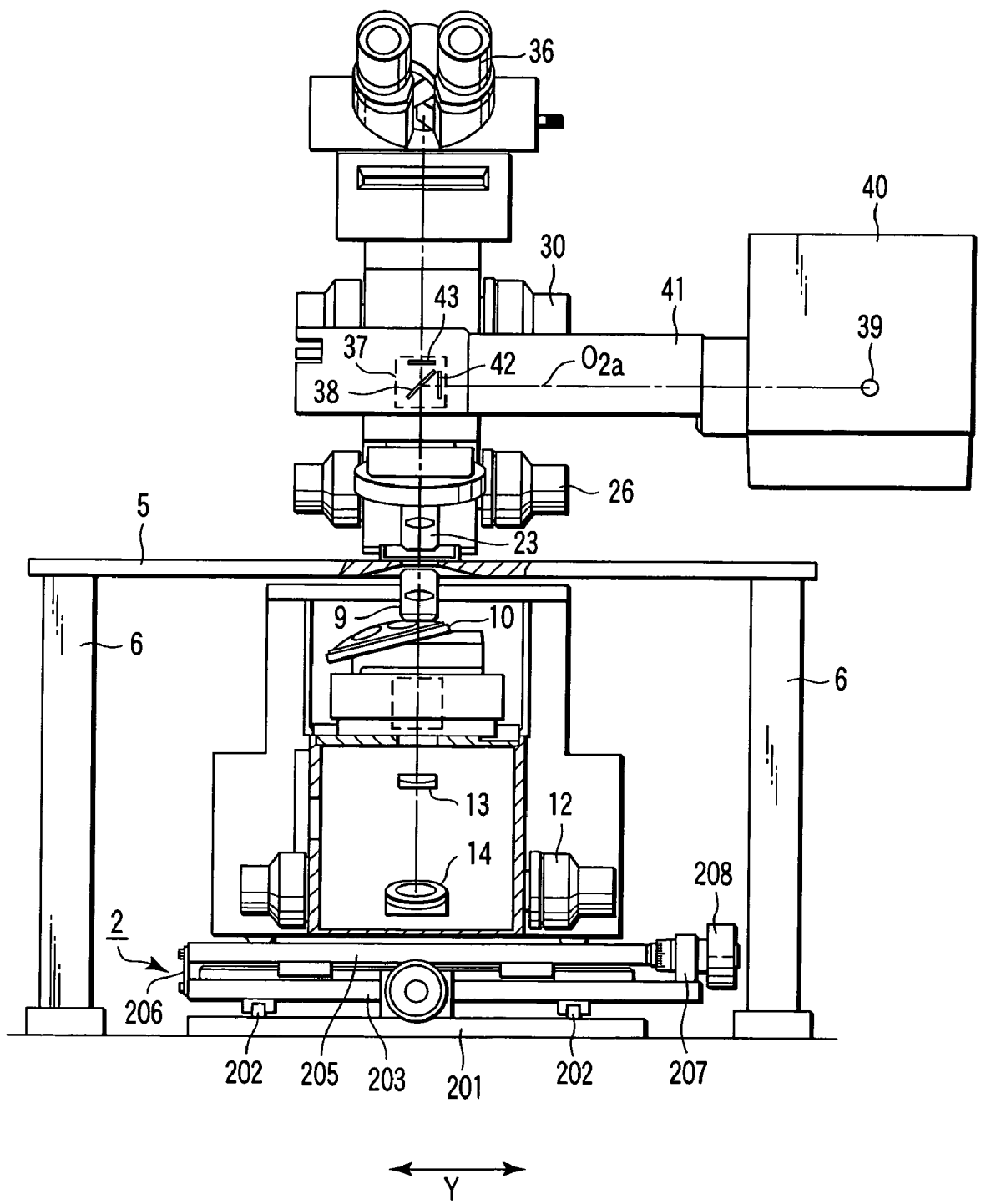
FIG. 4B is a front view that shows a schematic configuration of the system microscope according to the first embodiment of the present invention.

FIG. 4A and FIG. 4B are views that schematically show the configuration of a system microscope according to a first embodiment of the present invention. FIG. 4A is a side view and FIG. 4B is a front view. The system microscope shown in FIG. 4A and FIG. 4B is used for fluorescent observation.

In FIG. 4A and FIG. 4B, an X-Y stage 2 that serves as driving means is fixed on a reference surface (e.g. surface plate) that supports the entirety of the system microscope. An inverted microscope 4 is disposed on the X-Y stage 2. The inverted microscope 4 is configured to observe a specimen 3 from below, and has a lower-side observation optical path $O_1$.

A stage 5 serving as specimen mounting means for mounting of the specimen 3 is disposed above the inverted microscope 4. The stage 5 is held by four stage legs 6 that are secured to the reference surface 1. In this case, the number of stage legs 6 is not limited to four, and may be three or more if the stage 5 can stably be supported. It is necessary, however, that each stage legs 6 be not disposed at a position on the extension of a rotational shaft of a micrometer 208 (to be described later) of the X-Y stage, or at a position on the extension of an operating section (e.g. rotary focusing knob 12 (to be described later)) that is provided on a side surface of the inverted microscope 4.

An microscope with upright frame 7 is disposed above the stage 5. The microscope with upright frame 7 is configured to observe the specimen 3 from above, and has an upper-side observation optical path $O_2$.

In this case, the lower-side observation optical path $O_1$ and upper-side observation optical path $O_2$ are parallel in the vicinity of the specimen 3, and an optical axis at the region, where the optical paths $O_1$ and $O_2$ are parallel, is denoted by symbol O.

A support column 8 is disposed upright on an upper surface 5a of the stage 5. The support column 8 is disposed parallel to the optical axis O and holds the microscope with upright frame 7 so that the microscope with upright frame 7 may move along the optical axis O.

Next, the respective structural components are described in detail.

The X-Y stage 2 has a base 201 that is fixed on the reference surface 1. Two ball guides 202 are disposed in parallel on the base 201 so as to extend in a direction perpendicular to the optical axis O. The ball guides 202 are provided with an X base 203 that functions as a driving member. The X base 203 is movable in the X direction along the ball guides 202.

Two ball guides 204 are disposed in parallel on the X base 203 so as to extend in a direction perpendicular to the ball guides 202. The ball guides 204 are provided with a hold member (Y base) 205 that functions as another driving member. The hold member 205 is movable in the Y direction along the ball guides 204.

The hold member 205 and X base 203 are elastically coupled at their Y-directional ends by an elastic member 206. A fixing member 207 is provided on that end portion of the X base 203, which is opposite to the end of the X base 203 where the elastic member 206 is attached. A micrometer 208 that functions as pushing means is provided on the fixing member 207. The micrometer 208 operates to push the hold member 205 in the Y direction against the elastic force of the elastic member 206.

Similarly, the base 201 and X base 203 are elastically coupled at their X-directional ends by an elastic member 209. A fixing member 210 is provided on that end portion of the base 201, which is opposite to the end of the base 201 where the elastic member 209 is attached. A micrometer 211 that functions as another pushing means is provided on the fixing member 210. The micrometer 211 operates to push the X base 203 in the X direction against the elastic force of the elastic member 209.

The inverted microscope 4 is disposed on the X-Y stage 2 with the above-described configuration.

The aforementioned stage 5 that is used in the inverted microscope 4 is formed of a rigid plate member. The stage 5 has a through-hole 5b at its central area, through which the optical axis O extends.

A lower objective lens 9 is disposed under the stage 5. The lower objective lens 9 is held and fixed by a nosepiece 10. The nosepiece 10 holds a plurality of lower objective lenses and is rotated to position a desired lower objective lens 9 on the optical axis O.

The nosepiece 10 is rotatably provided on a nosepiece hold table 11. The nosepiece hold table 11 is coupled to a rotary focusing knob 12 via a rack & pinion mechanism (not shown) that is provided within the inverted microscope 4. The rotary focusing knob 12 is rotated to vertically drive the nosepiece hold table 11 along the optical axis O, thereby varying a relative distance between the specimen 3 on the stage 5 and the lower objective lens 9 and enabling focusing on the specimen 3.

A tube lens 13 and a reflection mirror 14 are disposed along an optical path (lower-side observation optical path $O_1$) that is formed under the lower objective lens 9. Light from the specimen 3, which has become parallel light through the lower objective lens 9, is incident on the reflection mirror 14 via the tube lens 13. The reflection mirror 14 reflects the light, which is incident via the tube lens 13, in an obliquely upward direction (at an angle of 45° to the horizontal direction).

An eyepiece 15 is disposed on a reflective light path of the reflection mirror 14 via a relay optical system (not shown). The detection light from the specimen 3, which is reflected by the reflection mirror 14, is visually observed by the eyepiece 15.

A mirror cassette 19 is disposed on the optical path between the lower objective lens 9 and tube lens 13. The mirror cassette 19 is provided with a dichroic mirror 20. In this case, the mirror cassette 19 includes a plurality of optical elements (not shown) in addition to the dichroic mirror 20, and one of the optical elements including the dichroic mirror 20 is selectively positioned on the optical path.

Light from a light source 16 is incident on the dichroic mirror 20. The light source 16 is accommodated in a lamp house 17 that is fixed to the inverted microscope 4 via an incident-light illuminator 18.

In this case, the dichroic mirror 20 has such characteristics as to reflect light from the light source 16 and to pass detection light from the specimen 3. Thus, the light emitted from the light source 16 travels along an optical path $O_{1a}$ and is reflected by the dichroic mirror 20 along the lower-side optical path $O_1$. The reflected light is radiated on the specimen 3 via the lower objective lens 9. In addition, detection light emitted from the specimen 3 passes through the lower objective lens 9 and dichroic mirror 20.

In the mirror cassette 19, an excitation filter 21 is disposed on an optical path on the lamp house 17 side of the dichroic mirror 20, and an emission filter 22 is detachably disposed on an optical path on the tube lens 13 side of the dichroic mirror 20.

On the other hand, in the microscope with upright frame 7 that is disposed above the stage 5, an upper objective lens 23 is provided above the stage 5. The upper objective lens 23 is held and fixed to a nosepiece 24. The nosepiece 24 holds a plurality of upper objective lenses and is rotated to position a desired upper objective lens 23 on the optical axis O.

The nosepiece 24 is detachably attached to an arm 25. The arm 25 is integrally provided on a focusing unit 27. The focusing unit 27 is disposed so as to be movable along the support column 8. The focusing unit 27 is provided with a rotary focusing knob 26 and a rack & pinion mechanism (not shown). By a rotating operation of the rotary focusing knob 26, the focusing unit 27 is moved along the support column 8 in the vertical direction (i.e. the direction of optical axis $O_2$) via the rack & pinion mechanism. Thereby, a relative distance between the specimen 3 on the stage 5 and the upper objective lens 23 is varied, and focusing on the specimen 3 is enabled.

A fixing knob 28 is provided on the focusing unit 27. The fixing knob 28 fixes the focusing unit 27 at a desired level along the support column 8.

Another focusing unit 29 is disposed above the focusing unit 27. The focusing unit 29 has substantially the same configuration as the focusing unit 27. The focusing unit 29 is disposed to be movable along the support column 8. The focusing unit 29 is provided with a rotary focusing knob 30 and a rack & pinion mechanism (not shown). By a rotating operation of the rotary focusing knob 30, the focusing unit 29 is moved along the support column 8 in the vertical direction (i.e. the direction of optical axis $O_1$) via the rack & pinion mechanism. A fixing knob 31 is provided on the focusing unit 29. The fixing knob 31 fixes the focusing unit 29 at a desired level along the support column 8.

An arm 32 is integrally formed on the focusing unit 29. A binocular tube 33 is detachably attached to an upper part of the arm 32. The binocular tube 33 accommodates a tube lens 34 and a prism 35 and is equipped with an eyepiece 36. Light (observation image) emitted from the specimen 3 is converted to parallel light through the upper objective lens 23, and the parallel light travels through the tube lens 34 and is reflected by the prism 35. The reflected light is visually observed by the eyepiece 36.

A mirror cassette 37 is disposed on the optical path between the upper objective lens 23 and tube lens 34. The mirror cassette 37 is provided with a dichroic mirror 38. The mirror cassette 37 includes a plurality of optical elements (not shown) in addition to the dichroic mirror 38, and one of the optical elements including the dichroic mirror 38 is selectively positioned on the optical path.

Light from a light source 39 is incident on the dichroic mirror 38. The light source 39 is accommodated in a lamp house 40 that is fixed to the microscope with upright frame 7 via an incident-light illuminator 41.

In this case, the dichroic mirror 38 has such characteristics as to reflect light from the light source 39 and to pass detection light from the specimen 3. Thus, the light emitted from the light source 39 travels along an optical path $O_{2a}$ and is reflected by the dichroic mirror 38 along the upper-side optical path $O_2$. The reflected light is radiated on the specimen 3 via the lower objective lens 23. In addition, detection light from the specimen 3 passes through the upper objective lens 23 and dichroic mirror 38.

In the mirror cassette 37, an excitation filter 42 is disposed on an optical path on the lamp house 40 side of the dichroic mirror 38, and an emission filter 43 is detachably disposed on an optical path on the tube lens 34 side of the dichroic mirror 38.

The position of the excitation filter 21 (42) may be anywhere between the light source 16 (39) and the dichroic mirror 20 (38), and also the position of the emission filter 22 (43) may be anywhere between the dichroic mirror 20 (38) and the tube lens 13 (34).

The dichroic mirror 20, 38, excitation filters 21, 42 and emission filters 22, 43, which are used in the embodiment, are optimal ones that match with the wavelength characteristics of the detection light (fluorescent light) emitted from the specimen 3 and the excitation light selected by the excitation filters 21, 42.

The above-described system microscope is used mainly for fluorescent observation, but is also applicable to other observation methods. In such cases, in accordance with the observation method, the excitation filters 21, 42 and emission filters 22, 43 are removed, where necessary.

The operation of the first embodiment with the above-described configuration will now be described.

On the inverted microscope 4 side, light is emitted from the light source 16 and the emitted light travels along the optical path $O_{1a}$ and falls on the dichroic mirror 20. Then, the light is reflected upward by the dichroic mirror 20 along the lower-side observation optical path $O_1$. The reflected light is radiated on the specimen 3 via the lower objective lens 9. Detection light (fluorescent light) emitted from the specimen 3 becomes parallel light through the lower objective lens 9. The parallel light passes through the dichroic mirror 20, and is reflected by the reflection mirror 14 via the tube lens 13. The reflected light is made incident on the eyepiece 15 via the relay optical system (not shown) and is visually observed.

On the other hand, on the microscope with upright frame 7 side, light emitted from the light source 39 travels along the optical path $O_{2a}$ and falls on the dichroic mirror 38. The light is then reflected downward by the dichroic mirror 38 along the upper-side observation optical path $O_2$. The reflected light is radiated on the specimen 3 via the upper objective lens 23. Detection light (fluorescent light) emitted from the specimen 3 passes through the objective lens 23, dichroic mirror 38 and tube lens 34, and is reflected by the prism 35. The reflected light enters the eyepiece 36 for visual observation.

In this state, consideration is first given to the case of simultaneously observing the same position on the specimen 3 by the inverted microscope 4 and microscope with upright frame 7 in the upward and downward directions. To start with, the Y-Y stage 2 is operated to move the inverted microscope 4 in the plane perpendicular to the optical axis O. Thereby, the lower-side observation path $O_1$ of the inverted microscope 4 is made to agree with the upper-side observation path $O_2$ of the microscope with upright frame 7. In this case, the micrometer 208 of the X-Y stage 2 is rotated and the hold member 205 is pushed in the Y direction against the elastic force of the elastic member 206 by a distance corresponding to the amount of rotation. Similarly, the micrometer 211 is rotated and the X base 203 is pushed in the X direction against the elastic force of the elastic member 209 by a distance corresponding to the amount of rotation. Thereby, the inverted microscope 4 is moved in the XY directions, and the lower-side observation path $O_1$ of the inverted microscope 4 is made to agree with the upper-side observation path $O_2$ of the microscope with upright frame 7. Hence, the inverted microscope 4 and microscope with upright frame 7 are enabled to perform simultaneous fluorescent observation of the same position on the specimen 3 in the upward and downward directions.

Next, consideration is given to the case of observing different positions on the specimen 3 by the inverted microscope 4 and microscope with upright frame 7. The X-Y stage 2 is operated to move the inverted microscope 4 in the plane perpendicular to the optical axis O, and the lower-side observation path $O_1$ of the inverted microscope 4 is displaced from the upper-side observation path $O_2$ of the microscope with upright frame 7. In this case, the micrometer 208 of the X-Y stage 2 is rotated and the hold member 205 is pushed in the Y direction against the elastic force of the elastic member 206 by a distance corresponding to the amount of rotation. At the same time, the micrometer 211 is rotated and the X base 203 is pushed in the X direction against the elastic force of the elastic member 209 by a distance corresponding to the amount of rotation. Thereby, the inverted microscope 4 is moved in the XY directions, and the lower-side observation path $O_1$ of the inverted microscope 4 is displaced the upper-side observation path $O_2$ of the microscope with upright frame 7 by a predetermined amount in a desired direction. Hence, the inverted microscope 4 and microscope with upright frame 7 are enabled to execute simultaneous fluorescent observation of different positions on the specimen 3 in the upward and downward directions.

In this case, even if the hand is released from the micrometer 208 (211) after the observation position of the inverted microscope 4 is determined, the hold member 205 (X base 203) of the X-Y stage 2, which is pushed by the pushing operation of the micrometer 208 (211), is urged to the micrometer 208 (211) side by the elastic force of the elastic member 206 (209). Thus, unintentional movement of the X-Y stage 2 is prevented, and the observation position of the inverted microscope 4 can exactly be maintained. In addition, the entire optical system of the inverted microscope 4 is moved as one body, and the positional relationship between the optical paths of the lower objective lens 9 and tube lens 13 is invariable. Therefore, it is possible to prevent the detection light from the specimen 3, which has become parallel light via the lower objective lens 9, from being eclipsed by the tube lens 13. Moreover, since the positional relationship between the optical paths of the lower objective lens 9 and dichroic mirror 20 can also be made constant, all light from the light source, which is reflected by the dichroic mirror 20, can be made incident on the lower objective lens 9.

Thus, by moving the inverted microscope 4 relative to the microscope with upright frame 7 in the plane perpendicular to the optical axis O, two different positions on the specimen 3 in the X and Y directions can simultaneously be observed in the upward and downward directions. The relative positions of the observation points on the specimen 3 at this time can easily be confirmed on the basis of the amount of pushing of the micrometer 208, 211.

In the inverted microscope 4 and microscope with upright frame 7, invariable is not only the positional relationship between the lower objective lens 9 and tube lens 13 but also the positional relationship between the upper objective lens 23 and tube lens 34. Thus, even if the specimen 3 is observed in either the upward direction or the downward direction, no eclipse of detection light occurs due to displacement of the observation position of the inverted microscope 4. The stable optical path is secured and the observation in the optimal state is always ensured.

Furthermore, the hold member 205 (X base 203) of the X-Y stage 2, which is pushed by the pushing operation of the micrometer 208 (211), is urged to the micrometer 208 (211) side by the elastic force of the elastic member 206 (209). Therefore, the observation position of the specimen 3 that is observed by the inverted microscope 4 can stably be maintained.

Second Embodiment

A second embodiment of the present invention will now be described.

Figure 5A:
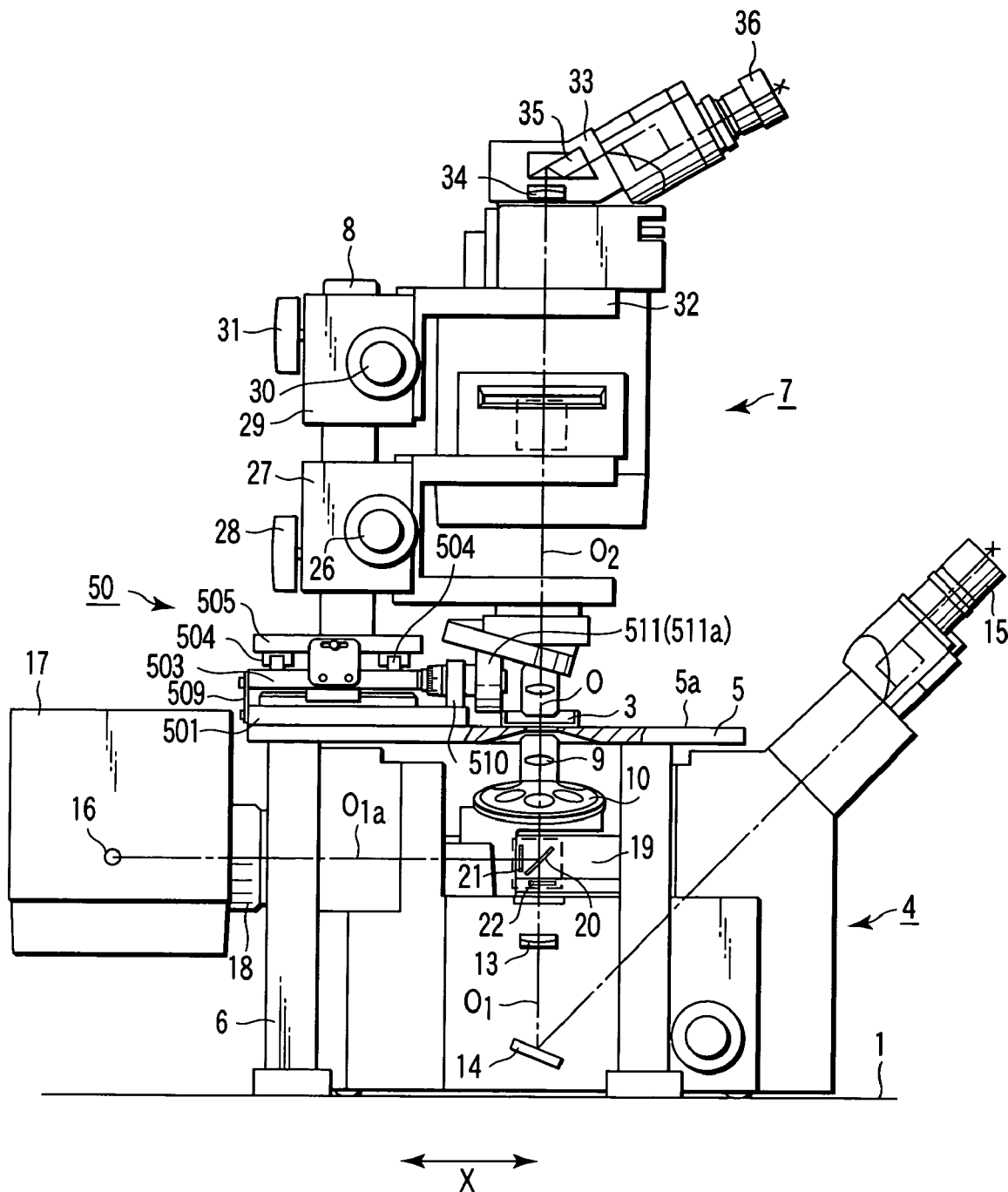
FIG. 5A is a side view that shows a schematic configuration of a system microscope according to a second embodiment of the present invention.
Figure 5B:
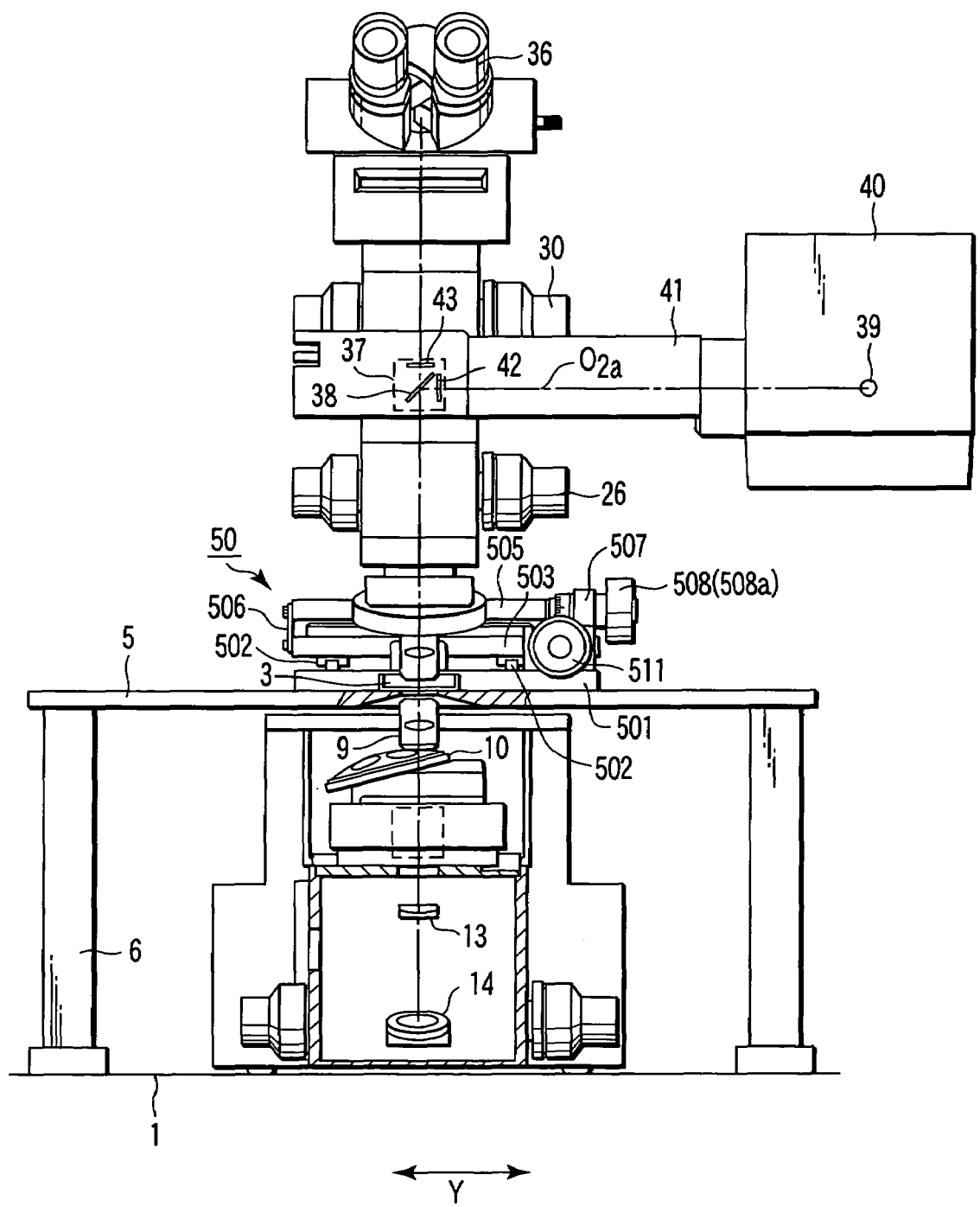
FIG. 5B is a front view that shows a schematic configuration of the system microscope according to the second embodiment of the present invention.

FIG. 5A and FIG. 5B are views that schematically show the configuration of a system microscope according to the second embodiment of the invention. FIG. 5A is a side view and FIG. 5B is a front view. In FIG. 5A and FIG. 5B, the parts common to those in FIG. 4A and FIG. 4B are denoted by like reference numerals.

In this embodiment, the inverted microscope 4 is directly fixed on the reference surface 1.

An X-Y stage 50 is secured on the stage 5 that is disposed above the inverted microscope 4. The X-Y stage 50 has the same configuration as the above-described X-Y stage 2. A base 501 is fixed on the stage 5. Two ball guides 502 are disposed in parallel on the base 501 so as to extend in a direction perpendicular to the optical axis O. The ball guides 502 are provided with an X base 503. The X base 503 is movable in the X direction along the ball guides 502. Two ball guides 504 are disposed in parallel on the X base 503 so as to extend in a direction perpendicular to the ball guides 502. The ball guides 504 are provided with a hold member 505 that serves as a Y base. The hold member 505 is movable in the Y direction along the ball guides 504.

The hold member 505 and X base 503 are elastically coupled at their Y-directional ends by an elastic member 506. A fixing member 507 is provided on that end portion of the X base 503, which is opposite to the end of the X base 503 where the elastic member 506 is attached. A micrometer 508 is provided on the fixing member 507. The micrometer 208 operates to push the hold member 505 in the Y direction against the elastic force of the elastic member 506. Similarly, the base 501 and X base 503 are elastically coupled at their X-directional ends by an elastic member 509. A fixing member 510 is provided on that end portion of the base 501, which is opposite to the end of the base 501 where the elastic member 509 is attached. A micrometer 511 is provided on the fixing member 510. The micrometer 511 operates to push the X base 503 in the X direction against the elastic force of the elastic member 509.

The micrometers 508 and 511 have operation handles 508a and 511a, respectively, which are both disposed on the right side, as viewed from the observer side, on the upper surface 5a of the stage 5.

A support column 8 is disposed upright on the X-Y stage 50. The support column 8 is disposed in parallel with the optical axis O. The microscope with upright frame 7 is held by the support column 8 so as to be movable along the optical axis O.

In the other respects, the configuration of the second embodiment is similar to that of the first embodiment shown in FIG. 4A and FIG. 4B.

With the configuration of the present embodiment, two different positions on the specimen 3 in the X and Y directions can simultaneously be observed in the upward and downward directions by the inverted microscope 4 and microscope with upright frame 7. In this case, the micrometers 508 and 511 of the X-Y stage 50 are operated to move the microscope with upright frame 7 in the plane perpendicular to the optical axis O. Thereby, the condensing point of illumination light from the microscope with upright frame 7 is displaced from the condensing point of illumination light from the inverted microscope 4 that is positioned on the optical axis O. Thus, the different positions on the specimen 3 can simultaneously be excited. These excited positions can simultaneously be observed by the inverted microscope 4 and microscope with upright frame 7.

In the inverted microscope 4 and microscope with upright frame 7, invariable is not only the positional relationship between the lower objective lens 9 and tube lens 13 but also the positional relationship between the upper objective lens 23 and tube lens 34. Thus, even if the specimen 3 is observed in either the upward direction or the downward direction, optimal observation can be performed with no eclipse of detection light due to displacement of the observation position of the microscope with upright frame 7.

Furthermore, the hold member 505 (X base 503) of the X-Y stage 50, which is pushed by the pushing operation of the micrometer 508 (511), is urged to the micrometer 508 (511) side by the elastic force of the elastic member 506 (509). Therefore, the observation position of the specimen 3 that is observed by the microscope with upright frame 7 can stably be maintained.

Besides, since the operation handles 508a and 511a of the micrometers 508 and 511 are disposed on the stage 5 that is positioned at a higher level than the reference surface 1, the observer can operate the micrometers 508 and 511 in stable posture, without viewing downward. In addition, since the operation handles 508a and 511a of the micrometers 508 and 511 are disposed at a distance from the specimen 3 on the right side as viewed from the observer side, works, such as replacement of the specimen 3 on the stage 5, can be performed with no problem.

Third Embodiment

Next, a third embodiment of the invention is described.

Figure 6A:
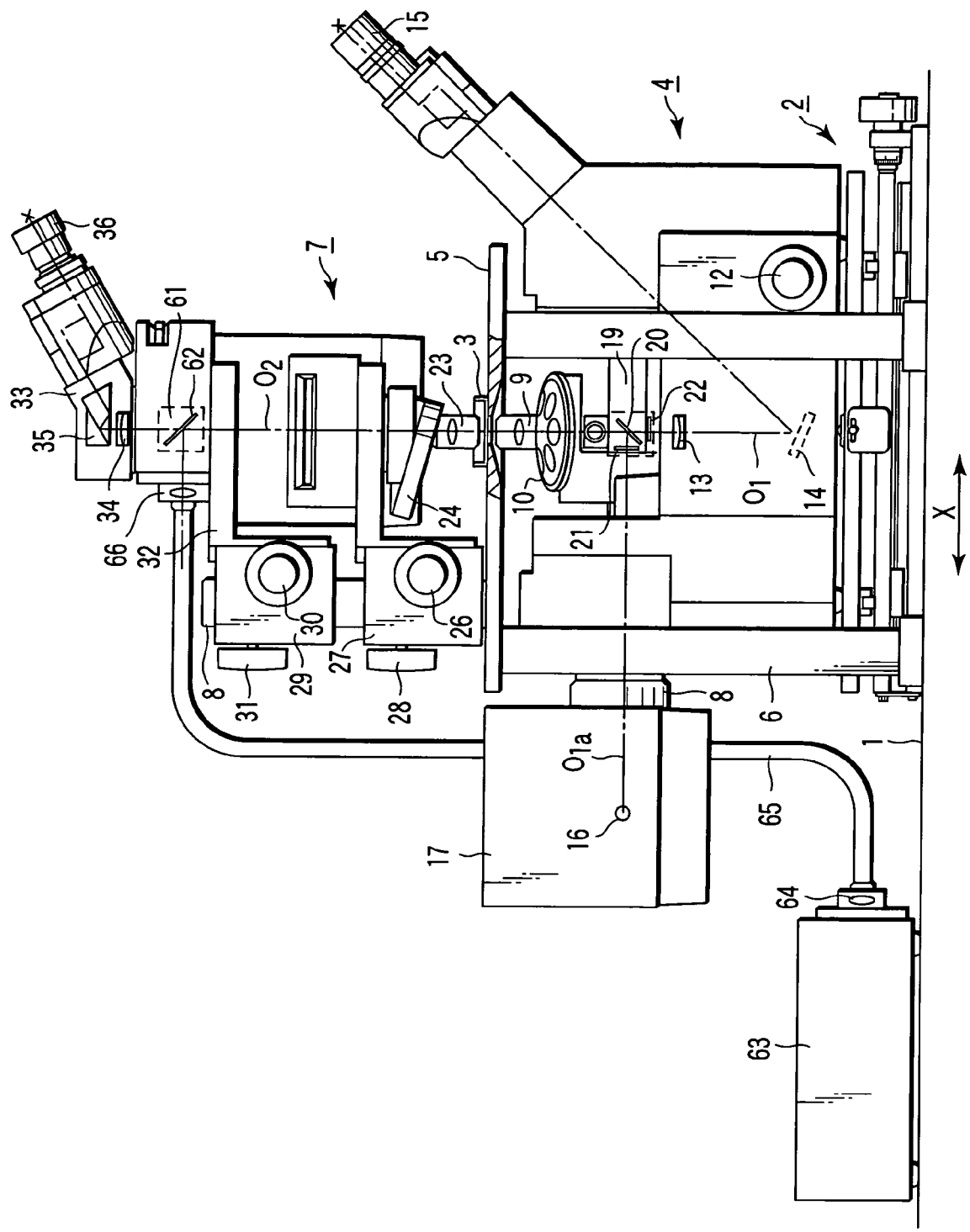
FIG. 6A is a side view that shows a schematic configuration of a system microscope according to a third embodiment of the present invention.
Figure 6B:
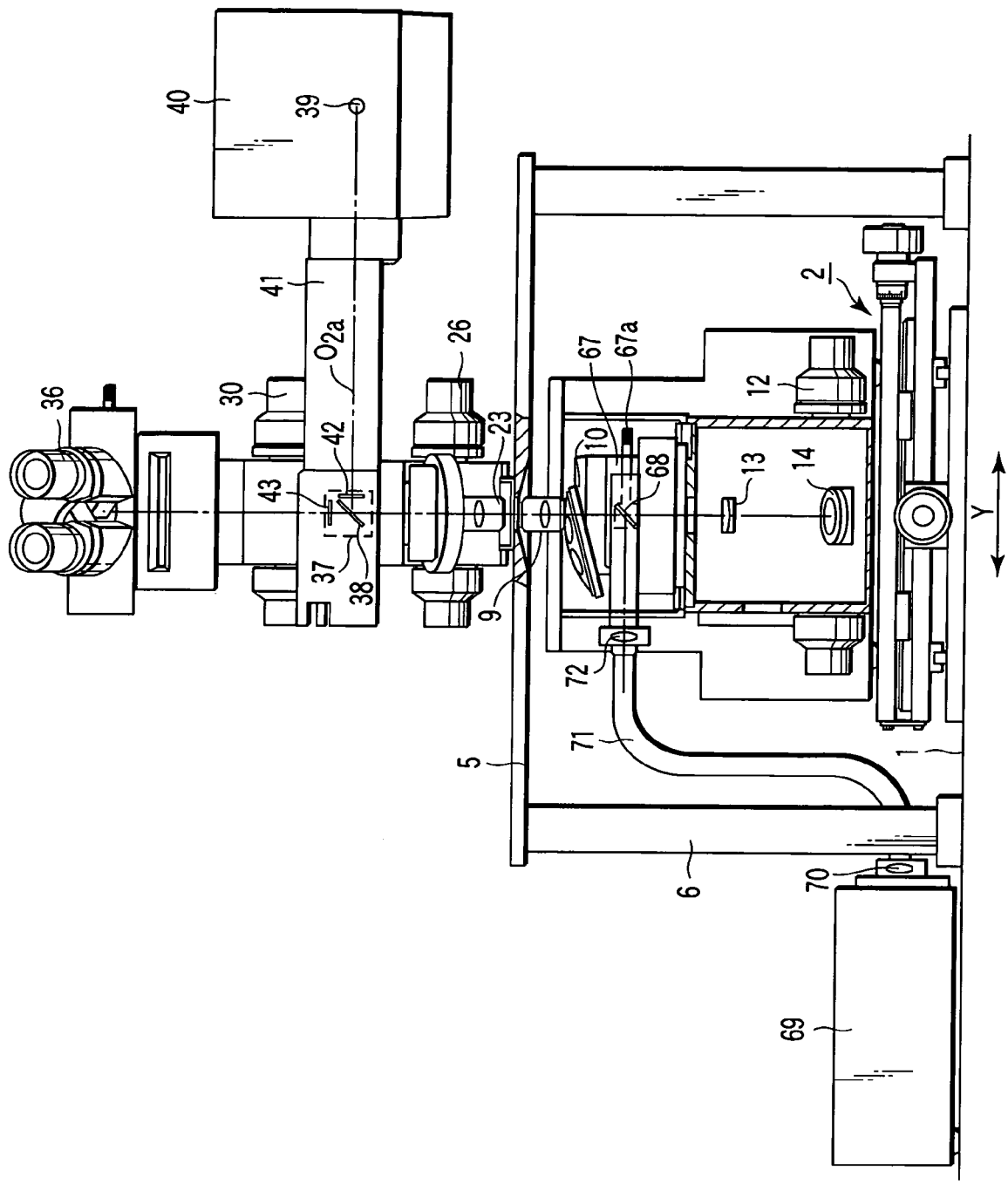
FIG. 6B is a front view that shows a schematic configuration of the system microscope according to the third embodiment of the present invention.

FIG. 6A and FIG. 6B are views that schematically show the configuration of a system microscope according to the third embodiment of the invention. FIG. 6A is a side view and FIG. 6B is a front view. In FIG. 6A and FIG. 6B, the parts common to those in FIG. 4A and FIG. 4B are denoted by like reference numerals.

In this embodiment, in the microscope with upright frame 7, a mirror cassette 61 is disposed on the optical path between the arm 32 and tube lens 34. The mirror cassette 61 is provided with a dichroic mirror 62. The mirror cassette 61 is rotated to selectively position the dichroic mirror 62 on the optical path. The dichroic mirror 62 has such characteristics as to reflect a laser beam from a laser oscillator 63 (to be described later) and to pass detection light from the specimen 3.

A laser beam from the laser oscillator 63 is incident on the dichroic mirror 62. The laser oscillator 63 generates a laser beam with a predetermined wavelength. A light incidence end of an optical fiber cable 65 is connected to the laser oscillator 63 via a collimator lens 64. A collimator lens 66 is disposed at a light emission end of the optical fiber cable 65. A laser beam, which has become a parallel beam through the collimator lens 66, is incident on the dichroic mirror 62.

On the other hand, in the inverted microscope 4, a mirror holder 67 is disposed on the optical path between the lower objective lens 9 and mirror cassette 19. The mirror holder 67 is provided with a dichroic mirror 68. The mirror holder 67 is operated by a knob 67a to selectively position the dichroic mirror 68 on the optical path. The dichroic mirror 68 has such characteristics as to reflect a laser beam from a laser oscillator 69 (to be described later) and to pass detection light from the specimen 3.

A laser beam from the laser oscillator 69 is incident on the dichroic mirror 68. The laser oscillator 69 generates a laser beam with a predetermined wavelength. A light incidence end of an optical fiber cable 71 is connected to the laser oscillator 69 via a collimator lens 70. A collimator lens 72 is disposed at a light emission end of the optical fiber cable 71. A laser beam, which has become a parallel beam through the collimator lens 72, is incident on the dichroic mirror 68.

In the other respects, the configuration of the second embodiment is similar to that of the first embodiment shown in FIG. 4A and FIG. 4B.

In the above-described configuration, to begin with, the mirror holder 67 in the inverted microscope 4 is operated to position the dichroic mirror 68 on the optical path. In this state, a laser beam is generated from the laser oscillator 69. The laser beam propagates through the optical fiber cable 71 and becomes a parallel beam through the collimator lens 72. The parallel beam is reflected by the dichroic mirror 68 and condensed on the focal point in the specimen 3 via the lower objective lens 9.

On the other hand, in the microscope with upright frame 7, as described in connection with the first embodiment, light is emitted from the light source 39 and made incident on the dichroic mirror 38 via the optical path $O_{2a}$. The light is then reflected downward along the upper-side observation path $O_2$ and radiated on the specimen 3 via the upper objective lens 23. Detection light (fluorescent light) from the specimen 3 travels through the upper object lens 23, dichroic mirror 38 and tube lens 34, and is reflected by the prism 35. The reflected light is made incident on the eyepiece 36 and visually observed.

In this case, at first, the micrometers 208 and 211 of the X-Y stage 2 are operated to move the inverted microscope 4 in the plane perpendicular to the optical axis O. The condensing point of the laser beam, which is radiated on the specimen 3 by the inverted microscope 4, is made to agree with the center of the observation field of the microscope with upright frame 7.

Subsequently, the micrometers 208 and 211 of the X-Y stage 2 are further operated. The inverted microscope 4 is moved in the XY directions by a distance corresponding to the amount of rotation of the micrometers 208 and 211, and the condensing point of the laser beam is displaced from the observation field center of the microscope with upright frame 7. In this case, the entire configuration of the inverted microscope 4 is moved as one body by the movement of the X-Y stage 2. The positional relationship between the optical fiber cable 71, collimator lens 72, dichroic mirror 68 and lower objective lens 9 is invariable. Thus, all the laser beam emitted from the collimator lens 72 is reflected by the dichroic mirror 68 and made incident on the lower objective lens 9. Therefore, no distortion occurs in the beam spot shape of the laser beam that is radiated on the specimen 3 via the lower objective lens 9, and a stable intensity distribution is maintained.

By operating the X-Y stage 2 and moving the inverted microscope 4 in the plane perpendicular to the optical axis O, the condensing point of the laser beam that travels from the inverted microscope 4 to the specimen 3 can be moved and displaced from the observation field center of the microscope with upright frame 7. In this case, the entire configuration of the inverted microscope 4 is moved as one body by the movement of the X-Y stage 2, and the positional relationship between the respective optical elements is invariable. Therefore, no distortion occurs in the beam spot shape of the laser beam that is radiated on the specimen 3, and the intensity distribution can be stabilized.

In the above description, the laser beam is radiated on the specimen 3 from the inverted microscope 4 side, and the specimen 3 is observed by the microscope with upright frame 7. Reversely, the laser beam may be radiated on the specimen 3 from the microscope with upright frame 7 side, and the specimen 3 may be observed by the inverted microscope 4. In this case, the mirror cassette 61 in the microscope with upright frame 7 is operated to position the dichroic mirror 62 on the optical path. In this state, a laser beam is generated from the laser oscillator 63. The laser beam propagates through the optical fiber cable 65 and becomes a parallel beam through the collimator lens 66. The parallel beam is reflected by the dichroic mirror 62 and condensed on the focal point in the specimen 3 via the upper objective lens 23. On the other hand, in the inverted microscope 4, light is emitted from the light source 16 and made incident on the dichroic mirror 20. The light is then radiated on the specimen 3 via the lower objective lens 9. Detection light from the specimen 3 travels through the lower object lens 9, dichroic mirror 20 and tube lens 13, and can be visually observed by the eyepiece 15.

In this state, the X-Y stage 2 is operated to make the observation field center of the specimen 3, which is observed by the inverted microscope 4, agree with the condensing point of the laser beam that is radiated from the microscope with upright frame 7. Further, the X-Y stage 2 is operated to displace the observation field center of the inverted microscope 4 from the laser beam condensing point of the microscope with upright frame 7. Thereby, the same advantageous as described above can be obtained.

Fourth Embodiment

Next, a fourth embodiment of the present invention is described.

Figure 7A:
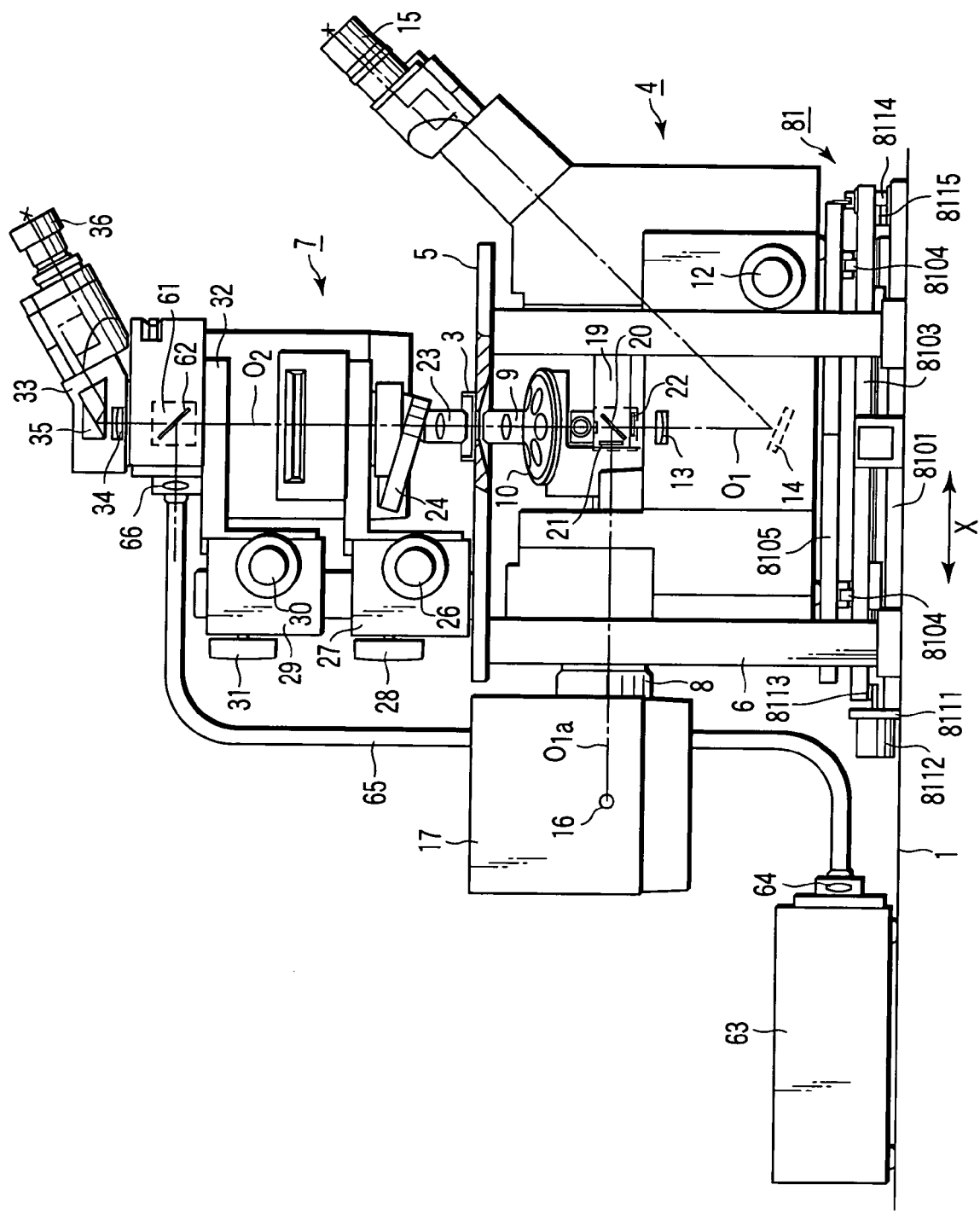
FIG. 7A is a side view that shows a schematic configuration of a system microscope according to a fourth embodiment of the present invention.
Figure 7B:
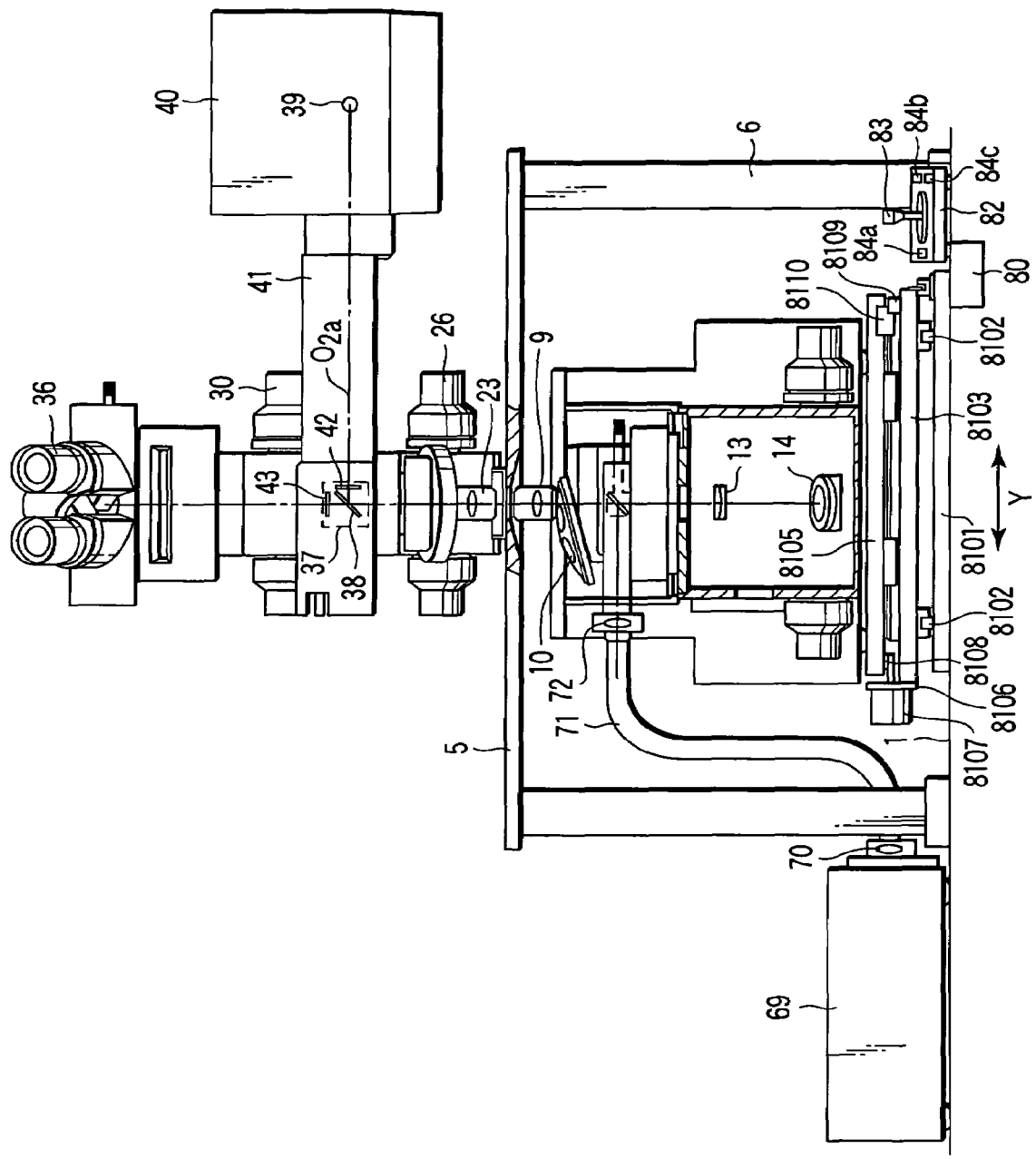
FIG. 7B is a front view that shows a schematic configuration of the system microscope according to the fourth embodiment of the present invention.

FIG. 7A and FIG. 7B are views that schematically show the configuration of a system microscope according to the fourth embodiment of the invention. FIG. 7A is a side view and FIG. 7B is a front view. In FIG. 7A and FIG. 7B, the parts common to those in FIG. 6A and FIG. 6B are denoted by like reference numerals.

In this embodiment, the inverted microscope 4 is provided on the reference surface 1 via a motor-driven X-Y stage 81. The motor-driven X-Y stage 81 has a base 8101 that is fixed on the reference surface 1. Two ball guides 8102 are disposed in parallel on the base 8101 so as to extend in a direction perpendicular to the optical axis O. The ball guides 8102 are provided with an X base 8103. The X base 8103 is movable in the X direction along the ball guides 8102.

Two ball guides 8104 are disposed in parallel on the X base 8103 so as to extend in a direction perpendicular to the ball guides 8102. The ball guides 8104 are provided with a hold member 8105 that functions as a Y base. The hold member 8105 is movable in the Y direction along the ball guides 8104.

A stepping motor 8107 is provided at a Y-directional end of the X base 8103 via a mount 8106. Driving force transmission means 8108 is provided at a distal end of a rotational shaft of the stepping motor 8107 such that the driving force transmission means 8108 is interposed between the distal end of the rotational shaft and the hold member 8105. The driving force transmission means 8108 comprises a gear (not shown), which is provided at the distal end of the rotational shaft of the stepping motor 8107, and a rack (not shown) that is meshed with the gear and is disposed in the direction of movement of the hold member 8105. By the rotation of the gear driven by the stepping motor 8107, the hold member 8105 can be moved in the Y direction via the rack.

The X base 8103 is provided with a photosensor 8109. A flag 8110 that interrupts light falling on the photosensor 8109 is fixed to the hold member 8105. The photosensor 8109 and flag 8110 move relative to each other in the Y direction. The position, where the state in which the flag 8110 does not interrupt light on the photosensor 8109 changes to the state in which the flag 8110 interrupts light on the photosensor 8109, is set as an operational reference position of the stepping motor 8107.

Similarly, a stepping motor 8112 is provided at an X-directional end of the base 8101 via a mount 8111. Driving force transmission means 8113 is provided at a distal end of a rotational shaft of the stepping motor 8112 such that the driving force transmission means 8113 is interposed between the distal end of the rotational shaft and the X base 8103. The driving force transmission means 8113 comprises a gear (not shown), which is provided at the distal end of the rotational shaft of the stepping motor 8112, and a rack (not shown) that is meshed with the gear and is disposed in the direction of movement of the X base 8103. By the rotation of the gear driven by the stepping motor 8112, the X base 8103 can be moved in the X direction via the rack.

The base 8101 is provided with a photosensor 8114. A flag 8115 that interrupts light falling on the photosensor 8114 is fixed to the X base 8103. The photosensor 8114 and flag 8115 move relative to each other in the X direction. The position, where the state in which the flag 8115 does not interrupt light on the photosensor 8114 changes to the state in which the flag 8115 interrupts light on the photosensor 8114, is set as an operational reference position of the stepping motor 8112.

In this case, the positions of the photosensors 8109, 8114 and the flags 8110, 8115 are set such that the X base 8103 and hold member 8105 are situated at their reference positions when the optical axis of the lower-side observation optical path $O_1$ of the inverted microscope 4 coincides with the optical axis of the upper-side observation optical path $O_2$ of the microscope with upright frame 7. A control unit 80 is connected to the stepping motors 8107 and 8112, and a controller 82 is connected to the control unit 80.

The controller 82 is provided with a joystick 83 and a plurality (three in the illustrated example) of switches 84a, 84b and 84c. The joystick 83 instructs the direction of movement and the amount of movement of the motor-driven X-Y stage 81 in accordance with the azimuth angle of turning of the operation handle and the amount of tilt of the operation handle. The switches 84a, 84b and 84c send signals for activating three algorithms described below to the control unit 80. The switches 84a, 84b and 84c and the three algorithms are in one-to-one correspondence with an origin-setting switch, a recording switch and a restoring switch.

The origin-setting switch 84a instructs the control unit 80 to execute the following control. That is, the control unit 80 determines the directions of rotation of the stepping motors 8107 and 8112 and rotates the stepping motors 8107 and 8112 at predetermined speeds on the basis of ON/OFF signals of the photosensors 8109 and 8114. If the outputs of the photosensors 8109 and 8114 have varied, the rotations of the stepping motors 8107 and 8112 are stopped. Thereby, the relative position between the hold member 8105 and X base 8103 of motor-driven the X-Y stage 81 and the relative position between the X base 8103 and base 8101 are restored to the reference positions. The recording switch 84b instructs the control unit 80 to execute a control to cause a recording device (not shown) to record the direction of movement and the amount of movement from the reference positions of the stepping motors 8107 and 8112 (the recorded data is reset when the origin-setting program is started). The restoring switch 84c instructs the control unit 80 to execute a control to restore the relative position between the hold member 8105 and X base 8103 of motor-driven the X-Y stage 81 and the relative position between the X base 8103 and base 8101 to the reference positions, and also a control to drive the stepping motors 8107 and 8112 on the basis of the direction of movement and the amount of movement, which are recorded on the recording device of the control unit. The origin-setting switch 84a, recording switch 84b and restoring switch 84c are distinguished with different colors in order to prevent confusion.

The inverted microscope 4 is disposed on the motor-driven X-Y stage 81 with the above-described configuration.

In the other respects, the configuration of the fourth embodiment is similar to that of the third embodiment shown in FIG. 6A and FIG. 6B.

In the above-described configuration, to begin with, a laser beam is generated from the laser oscillator 69 of the inverted microscope 4. The laser beam propagates through the optical fiber cable 71 and becomes to a parallel beam through the collimator lens 72. The parallel beam is reflected by the dichroic mirror 68 and condensed on the focal point in the specimen 3 via the lower objective lens 9.

On the other hand, in the microscope with upright frame 7, light is emitted from the light source 39 and reflected by the dichroic mirror 38. The reflected light is radiated on the specimen 3 via the upper objective lens 23. Excited fluorescent light from the specimen 3 travels through the upper object lens 23, dichroic mirror 38 and tube lens 34, and is visually observed by the eyepiece 36.

If the origin-setting switch 84a is operated at this time, the motor-driven X-Y stage 81 is restored to the reference position. In this case, the relative position between the inverted microscope 4 and microscope with upright frame 7 is set at the reference position, and the optical axis of the lower-side observation optical path $O_1$ agrees with the optical axis of the upper-side observation optical path $O_2$ of the microscope with upright frame 7.

Subsequently, the joystick 83 of the controller 82 is operated to send a driving instruction for the motor-driven X-Y stage 81 to the control unit 80. Based on the input driving instruction, the control unit 80 delivers a rotational-direction signal and a pulse signal, as the driving instruction, to the stepping motor 8107, 8112. Thereby, the stepping motor 8107 rotates on the basis of the driving instruction, and transmits torque to the hold member 8105 via the gear and rack of the driving force transmission means 8108, thus driving the hold member 8105 in the Y direction. Accordingly, the inverted microscope 4 moves in the Y direction, relative to the microscope with upright frame 7. At the same time, the stepping motor 8112 also rotates on the basis of the driving instruction, and transmits torque to the X base 8103 via the gear and rack of the driving force transmission means 8113, thus driving the X base 8103 in the X direction. Accordingly, the inverted microscope 4 moves also in the X direction, relative to the microscope with upright frame 7.

Thus, with the operation of the joystick 83, the hold member 8105 and X base 8103 are moved and the inverted microscope 4 is moved in the plane perpendicular to the optical axis O. Thereby, the condensing point of the laser beam from the inverted microscope 4 can be displaced from the observation field center of the microscope with upright frame 7. In this case, the entire configuration of the inverted microscope 4 is moved as one body by the movement of the motor-driven X-Y stage 81, and the positional relationship between the respective optical elements is invariable. Therefore, no distortion occurs in the beam spot shape of the laser beam that is radiated on the specimen 3, and the intensity distribution can be stabilized.

In addition, the observer confirms the laser radiation position while visually observing with the eyepiece 36, and presses the recording switch 84b. Thereby, the recording device (not shown) records the data relating to the direction of movement and the amount of movement from the reference position of the laser radiation position at this time. Thereafter, even if the laser radiation position is moved to another point by the operation of the joystick, the data relating to the direction of movement and the amount of movement, which is recorded in the recording device, is read out by pressing the restoring switch 84c. Thus, the stepping motors 8107 and 8112 of the motor-driven X-Y stage 81 are driven, and the laser radiation position can be restored to the position based on the recorded data.

In the present embodiment, the single recording switch and the single restoring switch are provided. However, two or more recording switches and restoring switches may be provided. In the embodiment, the instruction relating to the direction of movement and the amount of movement of the motor-driven X-Y stage 81 is delivered from the controller 82 that is connected to the control unit 80. Alternatively, if a personal computer (PC) (not shown) is used for the control unit 80, the instruction relating to the direction of movement and the amount of movement of the motor-driven X-Y stage 81 can be delivered from the PC. In this case, the origin-setting switch 84a of the controller 82 is first pressed to set the relative position between the inverted microscope 4 and microscope with upright frame 7 at the reference position. In this state, observation through the eyepiece 36 is performed to confirm the position for laser irradiation on the basis of a cross (i.e. straight lines with scale marks intersecting at right angles) (not shown) that is positioned on the observation optical path. In this case, the point of the cross, at which the straight lines intersect, is set as the origin (0, 0), the upward direction and rightward direction with reference to the origin are set as positive directions, and the downward direction and leftward direction with reference to the origin are set as negative directions. Thus, the direction of the position for laser irradiation and the amount of movement are determined and input to the PC. The PC stores them in a memory as data relating to the position for laser irradiation. Thereafter, if the data in the memory is read out and is output as the driving instruction for driving the motor-driven X-Y stage 81, the stepping motors 8107 and 8112 are driven and the reproduction of the laser radiation position can be executed on the basis of the data stored in the memory.

The present invention is not limited to the above-described embodiments. Various modifications can be made in practice without departing from the spirit of the invention.

In addition, the embodiments include inventions in various stages, and various inventions can be derived from proper combinations of structural elements disclosed herein. For example, in the case where the problems described in the "Description of the Background Art" can be solved and the advantageous effects described in the specification can be achieved even if some structural elements are omitted from all the structural elements disclosed in the embodiments, the configuration without such structural elements can be derived as an invention.

The above-described embodiments include the following inventions.

(1) A system microscope including an upper-side observation optical path, which is provided on an upper side of a specimen and reaches upper-side observation means via an upper objective lens and an upper tube lens, and a lower-side observation optical path, which is substantially parallel to the upper-side observation optical path, is disposed on a lower side of the specimen and reaches lower-side observation means via a lower objective lens and a lower tube lens, the system microscope being characterized by including at least one first optical path that is provided between the upper objective lens and the upper tube lens, a first reflecting member that causes the first optical path to extend into the upper-side observation optical path, at least one second optical path that is provided between the lower objective lens and the lower tube lens, a second reflecting member that causes the second optical path to extend into the lower-side observation optical path, and a driving mechanism that moves at least one of the upper-side observation optical path and the lower-side observation optical path in a plane that is substantially perpendicular to the upper-side and lower-side observation optical paths.

(2) In the system microscope of (1), the driving mechanism is an electric driving mechanism that includes a hold member that holds the upper-side observation optical path and/or the lower-side observation optical path, an X guide member that is provided under the hold member and guides the hold member in a direction (X direction) perpendicular to upper and lower observation optical axes, a Y guide member that guides the X base in a direction (Y direction) different from directions of the upper and lower observation optical axes and the X direction, a base member that supports the Y guide member from below, a first driving force source that is fixed to the X base, a second driving force source that is fixed to the base member, a first driving force transmission unit that transmits a driving force of the first driving force source as a linear driving force to the hold member, a second driving force transmission unit that transmits a driving force of the second driving force source as a linear driving force to the X base, a first sensor that determines a relative position between the hold member and the X base, and a second sensor that determines a relative position between the X base and the base member, the electrical driving mechanism being characterized by including a control unit that controls the position of the electrical driving mechanism, and a memory device that is provided in the control unit and stores the position of the electrical driving mechanism.

According to the present invention, at least one of an inverted microscope and an microscope with upright frame is configured to be movable in a plane perpendicular to the observation optical path of the inverted microscope or the microscope with upright frame. Thereby, different positions on a specimen can be observed at the same time. In this case, even if the inverted microscope or microscope with upright frame is moved, the positional relationship between the optical elements thereof is invariable. Therefore, a stable optical path is secured, and observation can always be performed in the optimal state.

Furthermore, according to the present invention, the position of radiation on the specimen may be moved from the center of the observation viewing field and freely be set, without varying the shape of the laser beam.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical microscope system comprising:
   a specimen mounting part which is supported above a reference surface by a plurality of support members, and which mounts a specimen;
   an inverted microscope, which is provided on the reference surface below the specimen mounting part independently of the plurality of support members, and which includes a first illumination path which radiates first optical illumination light from under the specimen mounting part, and an observation optical path which acquires detection light emitted from the specimen to which the first optical illumination light is radiated to observe the specimen from thereunder;
   a microscope with upright frame, which is provided on the specimen mounting part, and which includes a second illumination path which radiates second optical illumination light from above the specimen mounting part, and an observation optical path which acquires detection light emitted from the specimen to which the second optical illumination light is radiated to observe the specimen from thereabove; and
   a driving unit which integrally moves at least an entire one of the inverted microscope, including the first illumination path, and the microscope with upright frame, including the second illumination path, relative to the specimen mounting part, in a plane perpendicular to the observation optical path of the inverted microscope or the microscope with upright frame;
   wherein the inverted microscope and the microscope with upright frame observe different positions of the specimen simultaneously.

2. The optical microscope system according to claim 1, wherein the driving unit comprises a stage including driving members which are movable in two directions at right angles.

3. The optical microscope system according to claim 2, wherein the stage includes a pushing unit which pushes the driving members in moving directions of the driving members.

4. The optical microscope system according to claim 2, wherein the stage includes an electrical driving unit which drives the driving members in moving directions of the driving members.

5. The optical microscope system according to claim 2, wherein the stage is provided on the specimen mounting part.

6. The optical microscope system according to claim 1, wherein at least one of the inverted microscope and the microscope with upright frame includes a laser light source, and a laser optical path that radiates a laser beam from the laser light source to the specimen.

7. The optical microscope system according to claim 1, wherein the driving unit integrally moves the inverted microscope, including the first illumination path, relative to the reference surface.

8. The optical microscope system according to claim 1, wherein the support members are spaced from each other by a distance greater than a width of the inverted microscope.

9. An optical microscope system comprising:
   a specimen mounting part which is supported above a reference surface by a plurality of support members, and on which a specimen is mountable;
   an inverted microscope, which is provided on the reference surface independently of the plurality of support members, and which includes a first illumination path which radiates first illumination light from under the specimen mounting part, and an inverted observation optical path which acquires detection light emitted from the specimen to which the first illumination light is radiated to observe the specimen from thereunder;
   a microscope with upright frame, which is provided on the specimen mounting part, and which includes a second illumination path which radiates second illumination light from above the specimen mounting part, and an upright observation optical path which acquires detection light emitted from the specimen to which the second illumination light is radiated to observe the specimen from thereabove; and
   a stage which is arranged above the specimen mounting part and between the microscope with upright frame and the specimen mounting part, and which entirely moves the microscope with upright frame, including the second illumination path, in two directions normal to the upright observation optical path;
   wherein the inverted microscope and the microscope with upright frame observe different positions of the specimen simultaneously by moving the microscope with upright frame, including the second illumination path.

10. The optical microscope system according to claim 9, wherein the stage includes a pushing unit which pushes the driving members in moving directions of the driving members.

* * * * *